Nov. 25, 1941.    J. F. GREGG    2,263,625
POWER GEAR MECHANISM
Filed Nov. 24, 1939    2 Sheets-Sheet 2

Inventor
J. Floyd Gregg
By Tefft + Tefft
Attys

Patented Nov. 25, 1941

2,263,625

UNITED STATES PATENT OFFICE 2,263,625

POWER GEAR MECHANISM

Jonas Floyd Gregg, Mishawaka, Ind.

Application November 24, 1939, Serial No. 305,798

3 Claims. (Cl. 74—75)

This invention relates to a power gear mechanism, and particularly to a mechanism of this class for producing both rotary and oscillatory movement.

The particular object of the invention is to provide a power transmission which may be conveniently and compactly combined with an electric motor to form a unitary power gear transmission.

Another object is to provide means whereby two speeds of rotary movement and one oscillatory movement may be transmitted from such a unitary power gear transmission.

And a still further object is to provide means whereby two speeds of rotary movement and one oscillatory movement may be transmitted from one end of such a unitary power gear transmission.

Other objects and benefits will be disclosed in the following descriptions and drawings in which.

Figure 1:
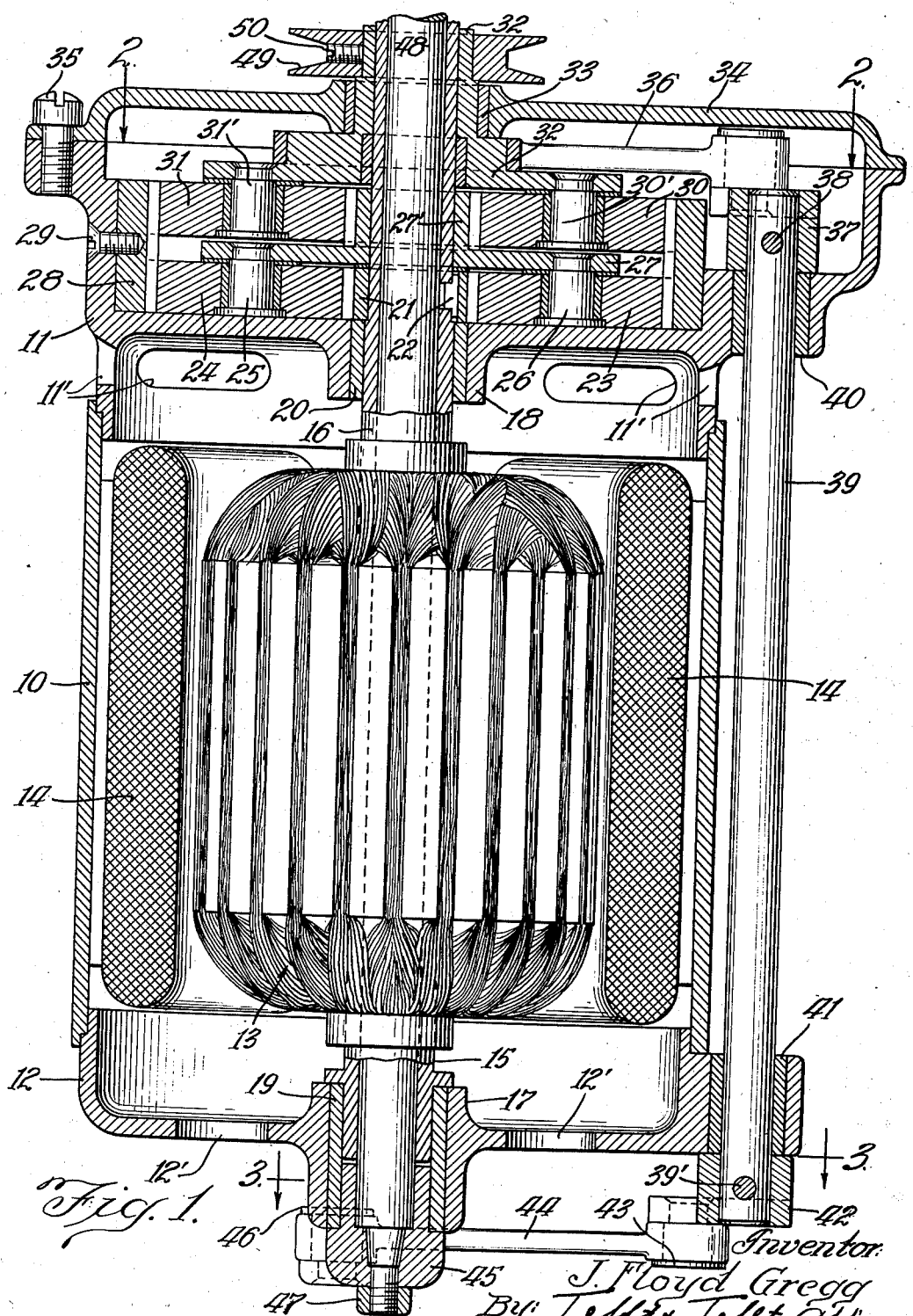
Fig. 1 is a cross sectional elevation view of my unitary power gear unit.

Now referring to the drawings, and at the outset particularly to Fig. 1, I designate a conventional motor frame by the numeral 10 and the end bells for the frame by the numerals 11 and 12. The end bells are provided with ventilation openings 11' and 12' as shown. Mounted in the end bells is a conventional rotor 13 in proper electrical relation to the stator 14 mounted in the frame 10. The rotor 13 is mounted on a hollow shaft having double extensions 15 and 16. The shaft extensions are mounted in conventional bearings, the extension 15 being mounted in the bearing 19 of the bearing boss 17, and the extension 16 being mounted in the bearing 20 of the bearing boss 18. Outside of the bearing 20 the hollow shaft 16 mounts a spur sun pinion 21 affixed to the shaft 16 by the key 22. Mounted in a conventional planetary transmission manner with the sun pinion 21 are two planet gears 23 and 24 held together by an arm 27 having shoulder pin bearings 25 and 26. The planet pinions 23 and 24 mesh in a stationary internal gear 28 held in the bell cap 11 by screws 29.

It will be appreciated that by this structure the rotative movement of the shaft 16 is reduced in speed to rotative movement of the arm 27 by the well known gear laws covering such planetary transmissions.

Integral with the arm 27 is another sun pinion 27' which in turn meshes with planet gears 30 and 31 mounted on shoulder pin bearings 30' and 31' in an eccentric arm 32.

It will be appreciated that by this structure the reduced speed of the arm 27 and planet pinion 27' is again reduced by a similar planetary gearing so that the eccentric arm 32 revolves in a doubly reduced speed and, therefore, the high speed of the rotor shaft 16 is greatly reduced in rotary speed for the eccentric arm 32.

The eccentric arm 32 revolves in a bearing 33 inserted in a bell cap 34 mounted on the bell 11 by the screws 35.

Figure 2:
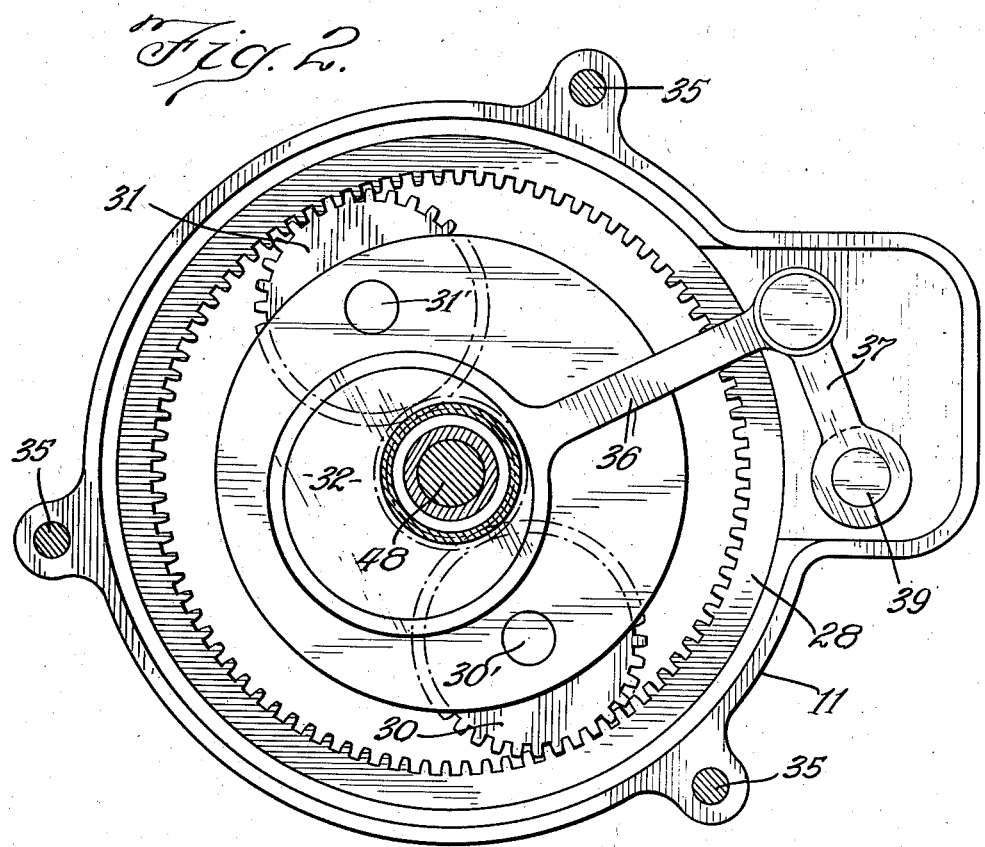
Fig. 2 is a sectional plan view of the unit as it would appear on the section lines 2—2 of Fig. 1.

The eccentric of the eccentric arm 32 drives a connecting rod 36 attached to a crank 37 affixed to the shaft 39 by the pin 38 mounted in bearings 40 and 41. As will be appreciated by referring to Fig. 2, the eccentric 32 through the connecting rod 36 and the crank 37 transmits an oscillatory movement to the shaft 39.

Figure 3:
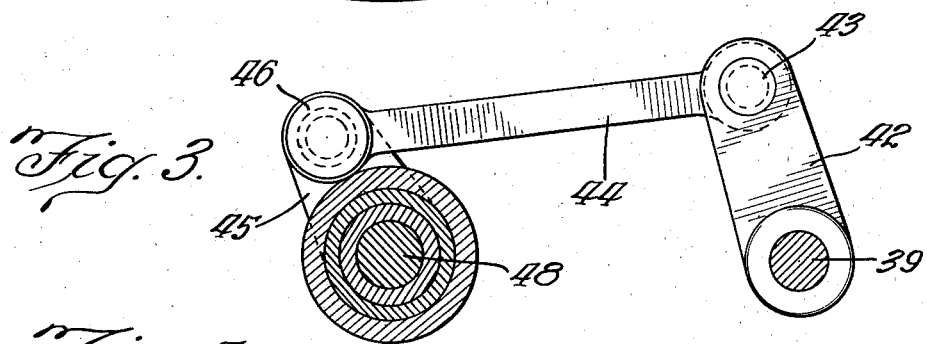
Fig. 3 is a sectional plan view as it would appear on the section lines 3—3 of Fig. 1.
Figure 4:
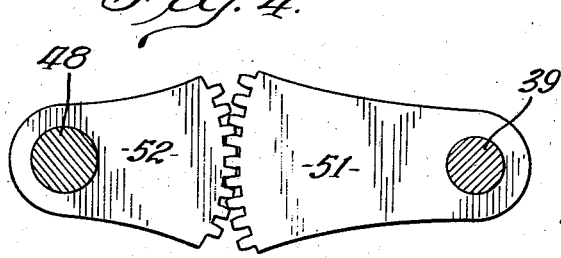
Fig. 4 is an optional structure for part of the mechanism as shown in Fig. 3, as will later be explained.

Mounted on the bottom of the shaft 39 is another crank 42 fixed to the shaft 39 by the pin 39'. This crank 42 carries another connecting rod 44 which is pivoted to the crank 42 by the shoulder pin 43 and to another crank 45 by the shoulder pin 46. By referring to Fig. 3, and noting the variations in the lengths of the cranks 42 and 45, it will be appreciated that increased oscillatory movement is imparted to the crank 45 by reason of the difference in the lengths of the cranks. These differences can be varied at will by the designer to give variations in the oscillation of the shaft 48 to which the crank 45 is attached, and if the desired oscillation of the shaft 48 is above the normal limits of such crank arm transmission, segment gears 51 and 52 may be substituted, as clearly shown in Fig. 4.

The shaft 48 is affixed to the crank 45 by conventional taper key and jam nut means 47, and, therefore, any movement of the crank 45 is directly transmitted to the shaft 48 which extends through the hollow shaft 16 and emerges at the upper end of my power gear mechanism where it may be attached to any mechanism requiring such oscillatory movement.

Likewise, the hollow shaft extension of the eccentric arm 32 emerges from the top of my power gear transmission, as clearly shown by the drawings, where it is available to transmit slow speed rotary motion, as for example through a V-belt pulley 49 affixed to the hollow shaft 32 by the set screw 50.

From the foregoing it will be well understood that I have provided a compact unitary power gear mechanism wherein I am able to transmit two rotary speeds and one oscillatory movement.

Having thus described my invention, I claim:

1. In a power gear mechanism for transmitting rotary and oscillatory motion, a motor having a tubular rotor shaft extending through an end bell, a dual double reduction planetary transmission mounted on said end bell and driven by said rotor shaft, a tubular slow speed eccentric arm shaft extending over said rotor shaft and through said end bell, an eccentric crank drive driven by said eccentric, and an oscillating drive shaft actuated by said eccentric drive extending through said tubular rotor shaft.

2. In a power gear transmission for simultaneous rotary and oscillating motion from concentric power take-off shafts, a dual double reduction planetary transmission, an eccentric drive mounted on the slow speed arm of the second planetary gear, an oscillating power shaft driven by said eccentric, and a slow speed power shaft driven by said slow speed arm.

3. In a power gear transmission for simultaneous rotary and oscillatory motion from concentric power take-off shafts extending in the same direction, a dual double reduction simple epicyclic gearing having a stationary internal gear, an eccentric drive mounted on the arm of the second epicyclic gear, an oscillating power shaft driven by said eccentric drive, and a slow speed rotary power shaft driven by said second epicyclic gear arm.

J. FLOYD GREGG.